H. B. WRIGHT.
LOCK NUT.
APPLICATION FILED MAR. 13, 1916.

1,207,356.

Patented Dec. 5, 1916.

Witness:
R. L. Farrington.

Inventor
Herbert B. Wright
By Glenn S. Noble
Atty.

UNITED STATES PATENT OFFICE.

HERBERT B. WRIGHT, OF CHICAGO, ILLINOIS.

LOCK-NUT.

1,207,356.  Specification of Letters Patent.  Patented Dec. 5, 1916.

Application filed March 13, 1916. Serial No. 83,947.

*To all whom it may concern:*

Be it known that I, HERBERT B. WRIGHT, a citizen of the United States, residing at Chicago, in the county of Cook and State of Illinois, have invented certain new and useful Improvements in Lock-Nuts, of which the following is a specification.

This invention relates to an improved form of nut which is adapted to be locked in position, either when tightly jammed against the part to be held or when positioned at any point along the bolt.

Among the objects of this invention are to provide a simple and efficient lock nut which may be readily manufactured on the usual machines adapted for making nuts; to provide a lock nut which will be positive in its gripping action, and which will remain securely in locked position; to provide a lock nut comprising two portions with means for locking the two portions together; and to provide such other advantages as will appear from the following description.

Figure 1:
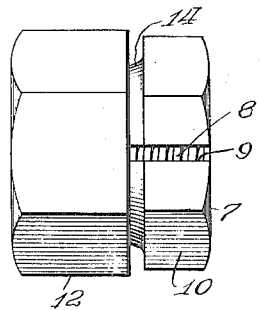
Figure 3:
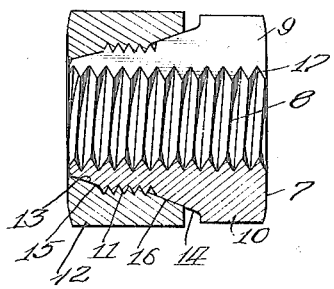
Figure 2:
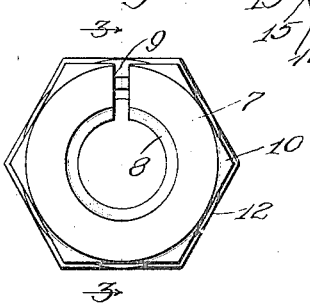
Figure 4:
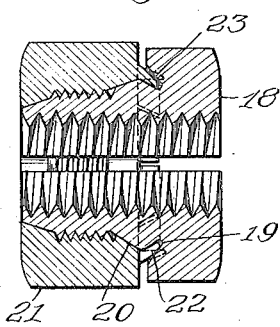
Figure 6:
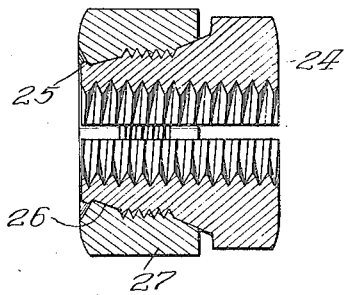
Figure 5:
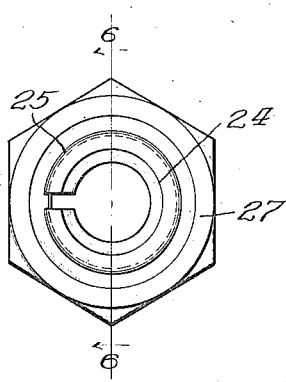

In the accompanying drawings illustrating this invention: Figure 1 is a side view of a preferred form of my device; Fig. 2 is an end view; Fig. 3 is a longitudinal sectional view taken on the line 3—3 of Fig. 2; Fig. 4 is a longitudinal sectional view showing a modified form of construction; Fig. 5 is an end view showing a still further modified form of construction; and Fig. 6 is a longitudinal sectional view taken on the line 6—6 of Fig. 5.

As illustrated in these drawings, 7 represents a nut having any standard or special form of threads 8. This nut is provided with a single longitudinal slot 9 extending entirely through one side thereof. One end 10 of the nut is made hexagonal, or of any other suitable form for engagement with a wrench. The other end of the nut is provided with a reduced portion 11, which is threaded for engagement with the locking sleeve or member 12. These threads are preferably made considerably finer than the threads of the nut proper. The reduced portion of the nut is provided with a beveled end 13, and with a beveled or conical portion 14, between the threaded portion and the wrench portion 10. The locking sleeve or collar 12 is provided with corresponding beveled portions 15 and 16 for engagement with the beveled portions 13 and 14. When the nut is to be locked in position, the operator screws the main portion to its desired location, and then tightens the locking sleeve 12, which forces the beveled portions thereof against the beveled portions of the nut proper, and thereby causes the nut to be compressed throughout its full length, so that it will bear closely against the threads of the bolt upon which it is placed. The slot 9 is made sufficiently wide so that it will allow for the compression of the nut, and is also preferably made sufficiently wide so that the inner corners or edges 17, formed where the threads of the nut terminate in the slot, will tend to turn in so as to bite against the corresponding edges of the threads of the bolt, and thereby give an additional jamming or locking action.

When the nut has thus been locked in position, there is practically no liability of its working loose, as the nut proper may be jammed so tightly against the threads of the bolt that it will hold under all conditions. Furthermore, the fine threads in the locking portion not only give a greater locking action, but also tend to hold the locking portion in position, which is further assisted by the friction of the beveled portions against the beveled portions of the nut.

This nut is particularly applicable for use where it is apt to be subjected to high temperatures, for the slot provides means whereby the nut proper may expand circumferentially without being spread away from the bolt. It will also be noted that the nut may be locked securely in any position along the bolt.

In the modified form of construction shown in Fig. 4, the nut 18 is provided with an inwardly extending circumferential groove 19 at the end of the tapered portion 20. The locking sleeve or member 21 is provided with an annular projection 22, the inner wall of which is approximately the same diameter as the largest diameter of the beveled portion 20, as indicated in dotted lines. When the locking member 21 is screwed into position, the projection 22 strikes against the outer wall 23 of the slot 19, and is bent inwardly, as indicated in full lines in this figure. The projection 22 is preferably slotted in a number of places, so that it will bend readily. It will be seen that this forms a simple expedient for permanently locking the two portions together, and further tending to prevent their working loose.

In the modified form of construction shown in Figs. 5 and 6, the nut 24 is provided at its outer end with an annular projection 25, which is adapted to engage with the reduced end 26 of the tapered portion of the locking member 27 when this locking member has been turned to locking position. It will be understood that this is a comparatively slight projection, so that the yielding of the small end of the nut will permit the locking portion 27 to pass over the same.

Having thus described my invention, which, however, I do not wish to limit to the exact construction herein shown and described, except as specified in the following claims, what I claim and desire to secure by Letters Patent is:

1. A lock nut comprising a nut having a central threaded bore and having a single longitudinal slot through the wall thereof, said nut having a taper at one end terminating in a cylindrical threaded portion, and a second tapered portion terminating in an enlarged turning or body portion of the nut, and a sleeve having threads to engage the last mentioned threaded portion, and having tapered walls for engaging the two tapered portions of the nut.

2. In a lock nut, the combination of a nut having interior threads for engagement with a bolt, and having a longitudinal extension terminating with an exteriorly beveled end, said extension having a cylindrical threaded portion with threads of finer pitch than those of the nut, a second beveled portion of larger diameter than the first-named portion, said nut also having a longitudinal slot through one side thereof, and a locking member having threads for engagement with said threaded portion of the extension, and beveled portions for engagement with the beveled portions of the extension.

3. A lock nut comprising a nut having interior threads for engagement with a bolt, and a longitudinal slot through one side thereof, the outer periphery of said nut being shaped to form an angular turning portion, an adjacent beveled portion terminating in a reduced cylindrical threaded portion having threads of finer pitch than the threads of the nut, said threaded portion terminating in a second beveled portion of smaller diameter than the first-named beveled portion, and a locking member having threads for engagement with the last-named threads, and having annular engaging portions for engaging with the beveled portions of the nut, to compress the nut when the locking portion is tightened.

4. In a lock nut, the combination of a nut having an exterior thread at one end thereof, terminating in beveled portions, an inwardly projecting groove between the larger beveled portion and the head of the nut, and a locking member having threads for engagement with said exterior threads, and having beveled portions for engagement with the beveled portions of the nut, said locking portion also having an annular member adapted to be forced into said groove and bent inwardly when the locking member is tightened.

5. In a lock nut, the combination of a nut having an interior thread for engagement with a bolt, and having an enlarged end at one end thereof, adapted to be engaged by a wrench, and a cylindrical extension, said cylindrical extension having threads in the middle thereof, and terminating in beveled portions, one of said beveled portions having a groove therein, and a locking sleeve having an interior thread, and means for engaging the beveled portions of the nut, and having a projection adapted to engage with the groove in said beveled portion.

HERBERT B. WRIGHT.